United States Patent
Jung et al.

(10) Patent No.: US 11,770,242 B1
(45) Date of Patent: Sep. 26, 2023

(54) METHOD FOR FORMING VIRTUAL PRIVATE NETWORK BASED ON POST-QUANTUM CRYPTOGRAPHY AND VIRTUAL PRIVATE NETWORK OPERATING SYSTEM PERFORMING SAME

(71) Applicant: NORMA Inc., Seoul (KR)

(72) Inventors: Hyunchul Jung, Seoul (KR); Chang Nyoung Song, Seoul (KR)

(73) Assignee: NORMA Inc., Seoul (KR)

( * ) Notice: Subject to any disclaimer, the term of this patent is extended or adjusted under 35 U.S.C. 154(b) by 0 days.

(21) Appl. No.: 18/080,686

(22) Filed: Dec. 13, 2022

(30) Foreign Application Priority Data

Sep. 1, 2022 (KR) ........................ 10-2022-0110895

(51) Int. Cl.
*H04L 9/40* (2022.01)
*H04L 9/08* (2006.01)
*H04L 9/30* (2006.01)

(52) U.S. Cl.
CPC .......... *H04L 9/0825* (2013.01); *H04L 9/0869* (2013.01); *H04L 9/3093* (2013.01)

(58) Field of Classification Search
CPC .... H04L 9/0825; H04L 9/0869; H04L 9/3093
See application file for complete search history.

(56) References Cited

U.S. PATENT DOCUMENTS

| | | | |
|---|---|---|---|
| 10,425,401 B1* | 9/2019 | Pecen ................. | H04L 63/0815 |
| 2022/0231843 A1* | 7/2022 | Garcia Morchon .. | H04L 9/3093 |
| 2022/0353089 A1* | 11/2022 | Masny ................. | H04L 9/3093 |
| 2023/0153070 A1* | 5/2023 | Garcia Morchon .... | G06F 17/16 |
| | | | 708/254 |

FOREIGN PATENT DOCUMENTS

JP 2014126866 A 7/2014

OTHER PUBLICATIONS

Minha Kim et al., Open Source Code Analysis on Lattice Based Post Quantum Cryptography, Korea Information Security Society Winter Academy papers, Nov. 28, 2020.

* cited by examiner

*Primary Examiner* — Thaddeus J Plecha
(74) *Attorney, Agent, or Firm* — Nicholas Park

(57) ABSTRACT

The technical idea of the present invention relates to a method for forming a virtual private network based on post-quantum cryptography and a virtual private network operating system performing the same. The method for forming a virtual private network performing by a first device to form a virtual private network with a second device according to an embodiment of the present invention comprises the steps of: requesting a handshake for forming the virtual private network; receiving a signature and a public key; authenticating the second device by using the signature; generating a symmetric key by using the public key; and performing virtual private network communication by using the symmetric key, wherein the public key is generated by using at least one key vector corresponding to a grid.

7 Claims, 12 Drawing Sheets

METHOD FOR FORMING VIRTUAL PRIVATE NETWORK BASED ON POST-QUANTUM CRYPTOGRAPHY AND VIRTUAL PRIVATE NETWORK OPERATING SYSTEM PERFORMING SAME

CROSS-REFERENCE TO RELATED APPLICATION

This application claims priority to and the benefit of Korean Patent Application No. 10-2022-0110895, filed on Sep. 1, 2022, the disclosure of which is incorporated herein by reference in its entirety.

BACKGROUND

Technical Field

The present invention relates to a method for forming a virtual private network that transmits and receives data by forming a virtual private network based on post-quantum cryptography, and a virtual private network operating system performing the same.

Related Art

A Virtual Private Network VPN is a private communication network used by companies or organizations to communicate over a public network without revealing its contents to the outside, and may form a secure channel between devices using a special TCP/IP-based protocol called a tunneling protocol.

As a method for implementing a virtual private network, there is a Secure Sockets Layer (SSL)-based virtual private network and an Internet Protocol Security (IPSEC)-based virtual private network that can access an internal network regardless of a place or a type of a terminal. The virtual private network encrypts information in communication between a web browser and a server, and is a security solution having the function of protecting the content of information even when the information is leaked through hacking on the way, thereby safely using internal system resources from a remote place to the Internet.

Meanwhile, with the development of quantum computers, the security of an encryption algorithm used in an existing cryptosystem has been weakened, and accordingly, a need for post-quantum cryptography, which is an encryption algorithm in which security is maintained even by a quantum computer, has emerged, and a virtual private network also needs to be applied by post-quantum cryptography in which security is maintained even by a quantum computer.

SUMMARY

Technical Problem

The present invention relates to a method for forming a virtual private network using post-quantum cryptography in an operation between devices for providing a virtual private network and a virtual private network operating system performing the same.

Technical Solution

A method for forming a virtual private network performed by a first device to form a virtual private network with a second device, according to an embodiment of the present invention, comprises the steps of: requesting a handshake for forming the virtual private network; receiving a signature and a public key; authenticating the second device by using the signature; generating a symmetric key by using the public key; and performing virtual private network communication by using the symmetric key, wherein the public key is generated by using at least one key vector corresponding to a lattice.

In an embodiment, the signature may include a signature value and a first hash value, and the step of authenticating the second device using the signature may include calculating a first matrix based on the signature value and the key matrix, obtaining upper N (N is a natural number) coefficients of a polynomial ring corresponding to the first matrix as first bits, and authenticating the server based on the first bits.

In an embodiment, the step of authenticating the server based on the first bit may include obtaining the first bit and a second hash value for the authentication message, determining whether the second hash value is the same to the first hash value, and determining that the authentication of the server is successful when the second hash value is the same to the first hash value.

In an embodiment, the step of generating the symmetric key using the public key may include generating a key message using a random number generator, generating a capsule random value through a hash for the key message, generating the key capsule by sealing the key message and the capsule random value using the public key, transmitting the key capsule, and generating the symmetric key using the key capsule.

In an embodiment of 10, the step of generating the symmetric key using the key capsule may include generating a prekey through hash of the key message and the public key, generating a key hash value by hashing the prekey and the key capsule, and generating the key hash value as the symmetric key.

A method for forming a virtual private network performed by a second device to form a virtual private network with a first device according to an embodiment of the present invention comprises the steps of: generating a public key and a private key; receiving a handshake request from the first device; performing a signature using an authentication message; transmitting the signature and the public key to the first device; and generating a symmetric key using a key capsule received from the first device, wherein at least one of the public key and the private key is generated using at least one key vector corresponding to a lattice.

In an embodiment, the step of generating the public key and the private key may include: defining a key matrix corresponding to a random polynomial ring; sampling a first key vector corresponding to a lattice and a second key vector having a first distance from the first key vector; and generating the key using the key matrix, the first key vector, and the second key vector.

In an embodiment, the step of defining the key matrix may include generating a random number by using a random number generator, generating a seed by substituting the random number into a hash function, generating the random polynomial ring by using the seed, and defining the key matrix corresponding to the random polynomial ring.

In an embodiment, the step of performing the signature may include obtaining a second bit based on the key matrix, obtaining a second hash value for the second bit and the authentication message, and generating a signature value using the second hash value and the first key vector.

In an embodiment, the obtaining of the first bit may include obtaining a signature random number by using a random number generator, calculating a second matrix by multiplying the key matrix by the signature random number, and obtaining upper N (N is a natural number) coefficients of a polynomial ring corresponding to the second matrix as the second bit.

In an embodiment, the step of generating the symmetric key by using the key capsule received from the first device may include the steps of: extracting a key message by opening the key capsule by using the private key; generating an open random value by hashing the key message; generating a verification capsule by sealing the key message and the open random value with the public key, determining whether the verification capsule are the same as the key capsule; generating a prekey by hashing the key message and the public key when the verification capsule is same as the key capsule; and generating the symmetric key by hashing the key capsule and the prekey.

DETAILED DESCRIPTION

Figure 1:
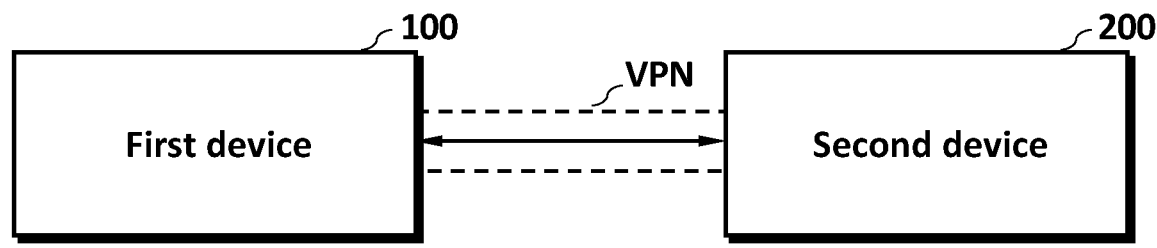
FIG. 1 is a block diagram illustrating a virtual private network operating system according to an example embodiment.

Hereinafter, exemplary embodiments of the present disclosure will be described in detail with reference to the accompanying drawings. Advantages and features of the present disclosure and methods of achieving them will become apparent with reference to embodiments described in detail below together with the accompanying drawings. However, the technical idea of the present invention is not limited to the following embodiments, but may be implemented in various different forms, and the following embodiments are provided to complete the technical idea of the present invention and to completely inform a person having ordinary skill in the art to which the present invention belongs of the scope of the present invention, and the technical idea of the present invention is only defined by the scope of Claims.

In adding reference numerals to elements in each drawing, it should be noted that the same elements will be designated by the same reference numerals, if possible, even though they are shown in different drawings. In addition, in describing the present invention, when it is determined that a detailed description of related known configurations or functions may obscure the gist of the present invention, the detailed description thereof will be omitted.

Unless otherwise defined, all terms (including technical and scientific terms) used herein have the same meaning as commonly understood by one of ordinary skill in the art to which the inventive concept belongs. In addition, terms defined in commonly used dictionaries are not interpreted ideally or excessively unless they are clearly specifically defined. The terminology used herein is for the purpose of describing embodiments and is not intended to be limiting of the present invention. In the specification, a singular form includes a plural form unless specifically mentioned in the text.

In addition, in describing components of the present disclosure, terms such as first, second, A, B, (a), (b), and the like may be used. The term is used only to distinguish a component from another component, and the nature, sequence, or order of the corresponding component is not limited by the term. When it is described that a component is "linked", "coupled", or "connected" to another component, the component may be directly connected or connected to the other component, but it should be understood that another component may be "linked", "coupled", or "connected" between the components.

It will be further understood that the terms "comprises" and/or "comprising" used in the present invention do not preclude the presence or addition of one or more other components, steps, operations and/or elements, as mentioned.

Components included in any one embodiment and components including a common function may be described using the same name in another embodiment. Unless stated otherwise, the description described in any one embodiment may be applied to other embodiments, and the detailed description may be omitted within a redundant range or a range that can be obviously understood by a person having ordinary skill in the art.

Hereinafter, some embodiments of the present invention will be described in detail with reference to the accompanying drawings.

Hereinafter, the present invention will be described in detail with reference to preferred embodiments of the present invention and the accompanying drawings.

FIG. 1 is a block diagram illustrating a virtual private network operating system according to an example embodiment;

Referring to FIG. 1, the virtual private network operating system 10 may include a first device 100 and a second device 200. In an embodiment, the virtual private network operating system 10 may operate the virtual private network VPN according to the SSL scheme, but the technical idea of the present disclosure is not limited thereto.

In an embodiment, the first device 100 and the second device 200 may be devices that desire to communicate with each other through a virtual private network VPN, and in an example, may be configured as a server or a client. In one example, the first device 100 or the second device 200 may include various communication-enabled terminal devices such as a cellular phone, a smart phone, a laptop, a personal computer (PC), a navigation, a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband Internet (Wibro) terminal, a smart pad, a tablet PC, etc. In another example, the first device 100 or the second device 200 may collectively refer to a server, an operating computer operating the server, and the like, and in one example, may be implemented in the cloud. In an embodiment, the first device 100 or the second device 200 may transmit data to each other using an application program such as a website, an application, or the like.

Each configuration of the virtual private network operating system 10 may be connected to communicate with each other in a wired or wireless manner, and when connected in a wired manner, each configuration included in the virtual private network operating system 10 may communicate with each other using a serial method, and when connected in a wireless manner, each configuration included in the virtual private network operating system 10 may communicate with each other using a wireless communication network, and the wireless communication network may include a Local Area Network (LAN), a Wide Area Network (WAN), the World Wide Web (WWW), a wired/wireless data communication network, a telephone network, a wired/wireless television communication network, 3G, 4G, 5G, 3rd Generation Partnership Project (3GPP), a 5th Generation Partnership Project (5GPP), a Long Term Evolution (LTE), a World Interoperability for Microwave Access (WIMAX), Wi-Fi, Internet (Internet), a Local Area Network (LAN), a Wireless Local Area Network (Wireless LAN), a Wide Area (WAN) Examples of the network include a communication network, a satellite broadcasting network, an analog broadcasting network, a digital multimedia broadcasting (DMB) network, and the like, but are not limited thereto.

Although not shown, the virtual private network operating system 10 may further include an authenticator. The authenticator may represent a terminal operated by an authority that issues a certificate to users, and may serve to verify the identity of a certificate holder in order to secure the trust of a transaction through the certificate.

In an embodiment, the first device 100 may receive at least one key generated based on a lattice from the second device 200, and may perform various operations for the first device 100 and the second device 200 to form the virtual private network VPN by using the key.

In this specification, the operation of the virtual private network operating system and the components included therein may mean an operation performed by a processor included in each component based on a computer program including at least one instruction stored in a storage device included in each component, and the storage device may include a non-volatile memory, a volatile memory, a flash memory, a hard disk drive (HDD), a solid state drive (SSD), or the like. The processor may include at least one of a Central Processing Unit (CPU), a Graphic Processing Unit (GPU), a Neural Processing Unit (NPU), a RAM, a ROM, a system bus, and an application processor.

Figure 2:
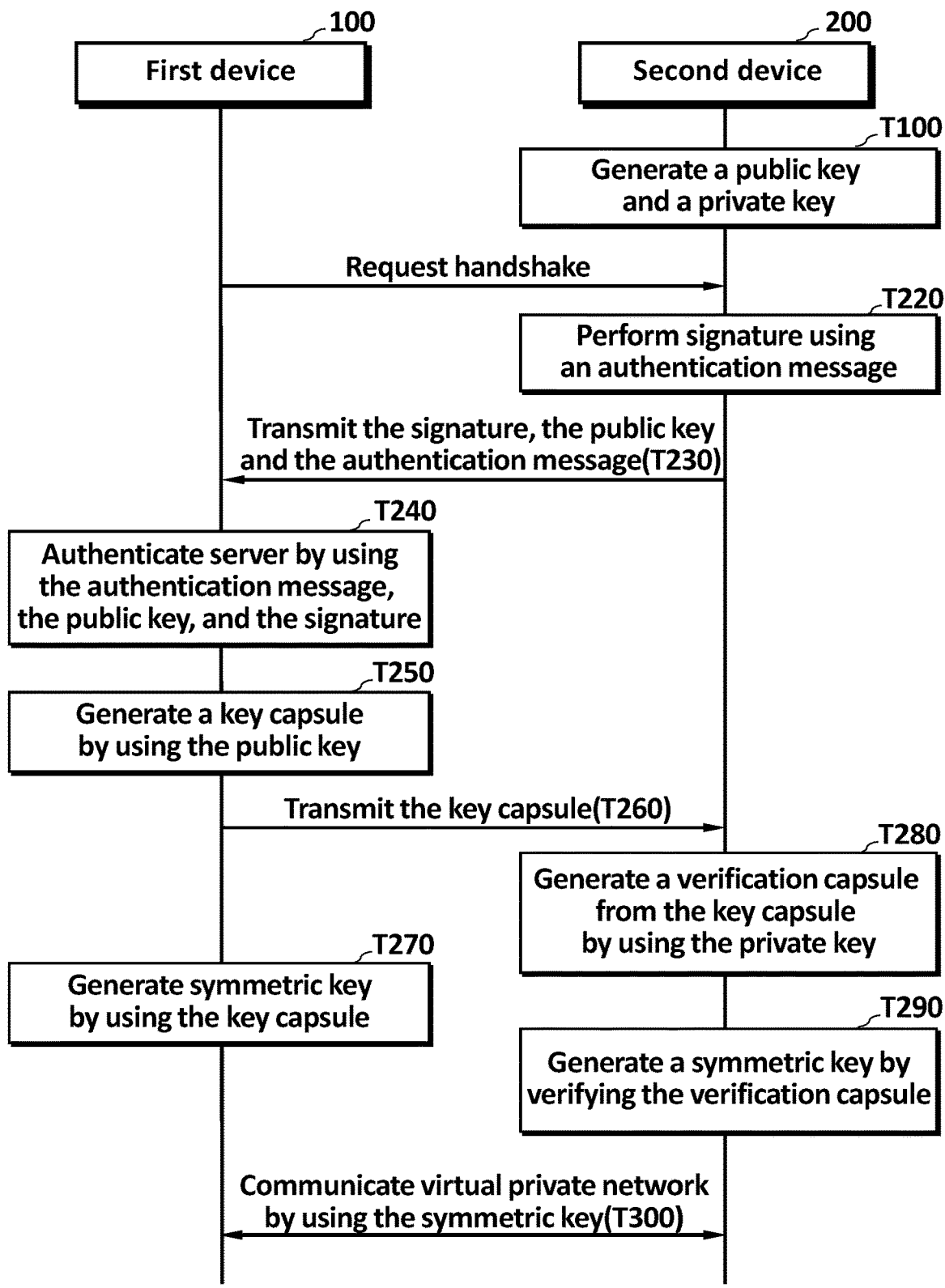
FIG. 2 is a flowchart illustrating a method of operating a virtual private network operating system according to an example embodiment.

FIG. 2 is a flowchart illustrating a method of operating a virtual private network operating system according to an example embodiment.

Referring to FIG. 2, the second device 200 may generate a public key and a private key of the first device 100 T100. In an embodiment, the second device 200 may generate a public key and a private key by using a lattice-based algorithm, which will be described in detail later with reference to FIGS. 3 to 5.

The first device 100 may transmit the handshake request to the second device 200. In this specification, the handshake may mean a series of processes in which the first device 100 and the second device 200 start communication to communicate using the virtual private network VPN, and in the symmetric key scheme, a symmetric key may be exchanged as a result of the handshake.

The second device 200 may perform a signature using an authentication message in response to the handshake request T220. A signature operation of the second device 200 will be described later with reference to FIG. 6. The second device 200 may transmit the generated signature, public key, and authentication message to the first device 100 T230. The first device 100 may authenticate the second device 200 by using the authentication message, the public key, and the signature T240. The authentication operation of the first device 100 will be described later with reference to FIG. 7.

When the authentication of the second device 200 is successful, the first device 100 may generate a key capsule by using the received public key T250. In the present specification, the sealing refers to an operation of concealing information that does not need to be exposed to the outside by enclosing the information like a capsule by generating a data path that can be accessed only by a subject having a public key by using the public key, and the opening refers to an operation of confirming the sealed information by using the public key or a private key corresponding to the public key. The first device 100 may generate a key capsule by sealing a key message corresponding to a random value using a public key, and the like, and a detailed description thereof will be described later in FIG. 8.

The first device 100 may transmit the generated key capsule to the second device 200 T260, and generate a symmetric key by using the generated key capsule T270. Also, the second device 200 may generate a verification capsule from the key capsule by using the private key corresponding to the public key T280. The second device 200 may generate the symmetric key by verifying the verification capsule generated from the key capsule T290. After the key exchange is completed, the second device 200 and the first device 100 may perform communication using the virtual private network VPN by using the symmetric key T300.

According to the inventive concept, by performing signature and authentication using a public key and a private key generated based on a lattice, even when an attacker attacks a key exchange during a key exchange process between the first device 100 and the second device 200, information about the key may not be leaked.

Further, according to the technical idea of the present disclosure, by generating a symmetric key by transmitting and receiving only a key capsule with double increased security by re-sealing the random value, an exchange of the symmetric key may be performed only by transmitting and receiving the key capsule without transmitting and receiving the symmetric key itself. As a result, even though the key capsule is exposed, information on the symmetric key is not exposed and security may be increased as the key exchange is finished.

According to an embodiment of the present disclosure, by performing the handshake between the first device 100 and the second device 200 using the public key using the lattice-based algorithm, the public key in the certificate may not be exposed to the attacker even when the attacker captures the certificate in the process of transmitting the certificate between the first device 100 and the second device 200, and the signature of the second device 200 and the authentication of the second device 200 may be smoothly performed even when the public key using the lattice-based algorithm is used by utilizing the unique signature algorithm and authentication algorithm.

Figure 3:
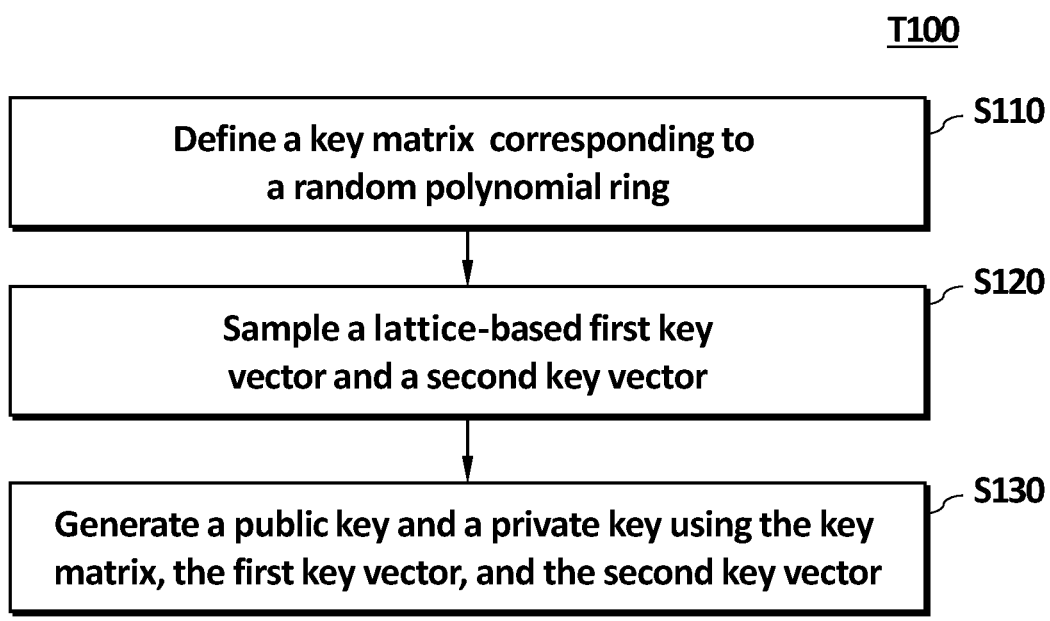
FIG. 3 is a flowchart illustrating a post-quantum key generation algorithm according to an example embodiment.

FIG. 3 is a flowchart illustrating a post-quantum key generation algorithm according to an example embodiment; In detail, FIG. 3 is a diagram illustrating the key generation method T100 of FIG. 2 in detail.

Referring to FIG. 3, the second device 200 may define a key matrix corresponding to the random polynomial ring S110. The polynomial ring may refer to a ring viewed from an abstract algebraic point of view with respect to a polynomial having a real number and a complex number as coefficients and an unknown number, and the random polynomial ring may refer to a polynomial ring of which coefficients are randomly determined. In addition, the key matrix corresponding to this may mean that the coefficient of the random polynomial ring is represented as a matrix.

The second device 200 may sample the first key vector and the second key vector by using a lattice-based algorithm S120. The lattice-based algorithm refers to an encryption algorithm based on mathematical problems on a lattice called a lattice problem, and the lattice problem includes a Shortest Vector Problem (SVP), a Shortest Independent Vectors Problem (SIVP), and a Closest Vector Problem (CVP). The security of the lattice-based algorithm is based on the fact that it is difficult to solve the above-described lattice problem, and since it is difficult to find a lattice point closest to an arbitrary position in a lattice of hundreds of dimensions, if a key is matched to the corresponding lattice point, it is difficult to find a private key corresponding to the position through quantum computing, and thus the lattice-based algorithm may be an alternative. In one example, if any location on the lattice corresponds to a public key and a particular location close to the public key corresponds to a private key, the private key can be hidden at the intersection of the multidimensional lattice, the number of possibilities of shortest vectors for the private key is infinite, and the process of traversing the range of possibilities and the number of permutations in the quantum computer cannot take advantage of the advantages of the quantum computer over the existing computer due to its complex nature. That is, the encryption key may be determined only when the attacker knows his or her own path through the lattice, that is, the attacker has no way to calculate the path, so it may be said that it is theoretically impossible for the attacker to calculate the private key. In an embodiment, a Gaussian distribution method and a dejection sampling method may be used to sample key vectors among a plurality of vectors generated using the lattice-based algorithm.

The second device 200 may generate a public key and a private key by using the generated key matrix, the first key vector, and the second key vector S130.

According to the technical idea of the present disclosure, a hacking attempt by quantum computing may be prevented by utilizing a lattice-based algorithm in a process of generating a key for the virtual private network VPN, and accordingly, security of the virtual private network VPN may be increased.

Figure 4:
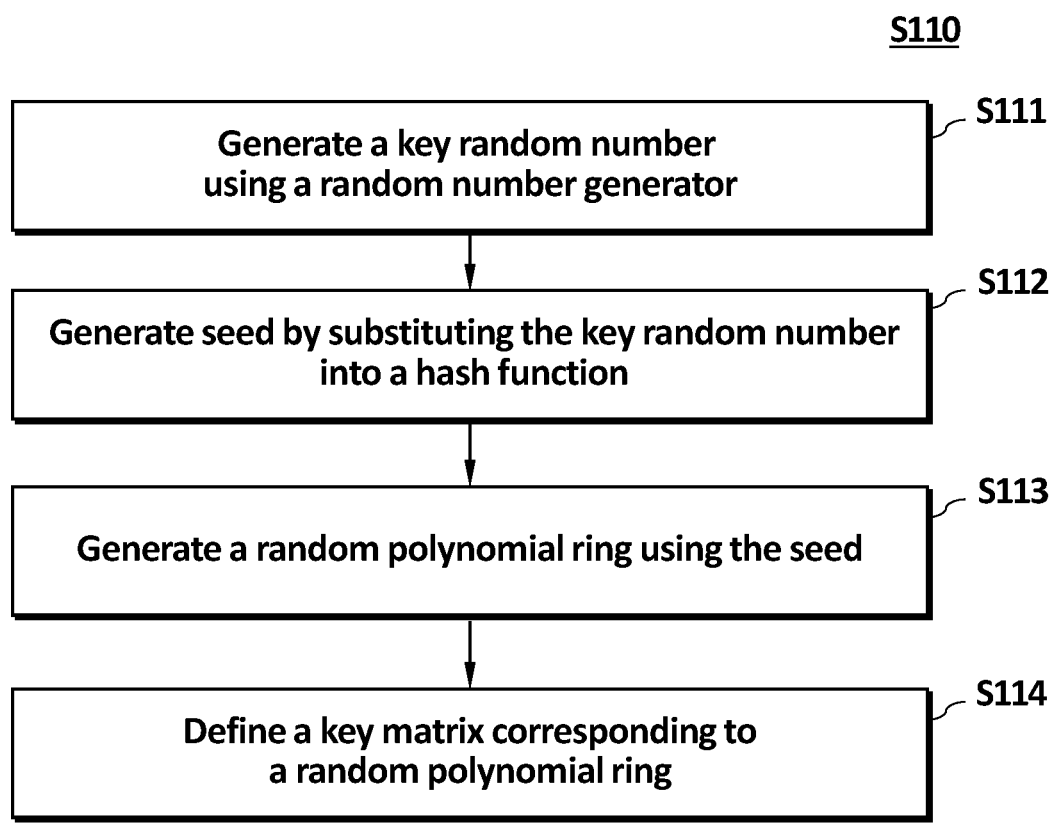
FIG. 4 is a flowchart illustrating a post-quantum key generation algorithm according to an example embodiment.

FIG. 4 is a flowchart illustrating a post-quantum key generation algorithm according to an example embodiment. In detail, FIG. 4 is a diagram illustrating the key matrix definition step S110 of FIG. 3 in detail.

Referring to FIG. 4, the second device 200 may generate a key random number using a random number generator S111. The random number generator refers to a device for generating a random number or symbol that cannot be theoretically predicted based on entropy, and may include a non-deterministic random bit generator (NRBG) and a deterministic random bit generator (DRBG) according to a noise source to be used.

The second device 200 may generate a seed by substituting the key random number into a hash function S112, and may generate a random polynomial ring using the seed S113. Also, the second device 200 may define a key matrix corresponding to the random polynomial ring S114.

According to an exemplary embodiment of the present disclosure, when defining a key matrix, a random number generator, a hash function, and a random polynomial ring are used to maximize randomness of the key matrix, and as a result, randomness of a key may be maximized.

Figure 5:
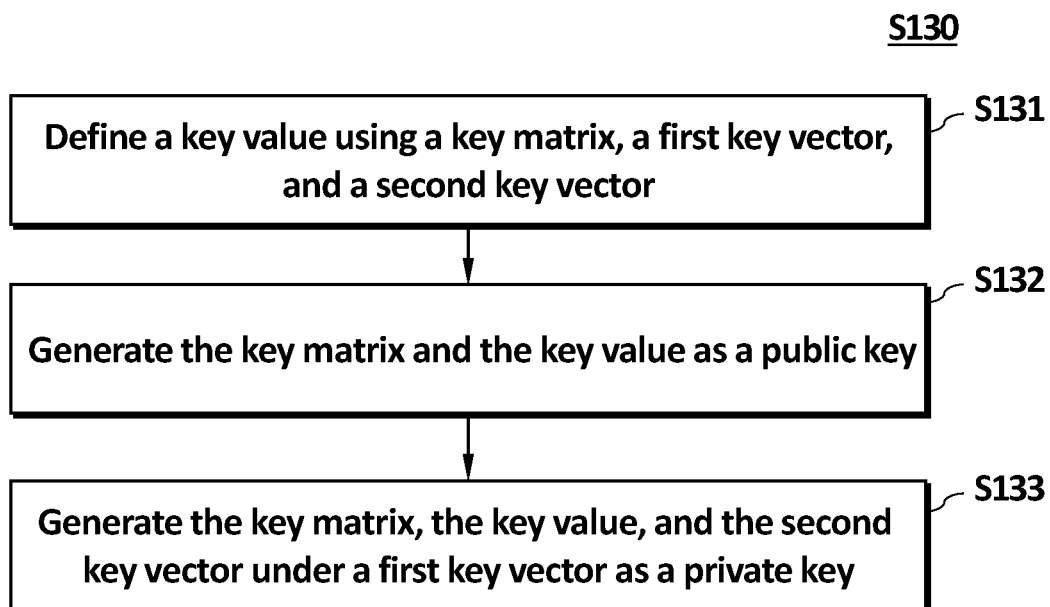
FIG. 5 is a flowchart illustrating a post-quantum key generation algorithm according to an example embodiment.

FIG. 5 is a flowchart illustrating a post-quantum key generation algorithm according to an example embodiment; In detail, FIG. 5 is a diagram illustrating the step of generating a public key and a private key S130 of FIG. 3 in detail.

Referring to FIG. 5, the second device 200 may define a key value by using a key matrix, a first key vector, and a second key vector S131. In one example, the key value k for the key matrix A, the first key vector v1, and the second key vector v2 may be defined as Equation 1 below.

$$k = A \cdot v1 + v2 \quad \text{Equation 1}$$

The second device 200 may generate a key matrix and a key value as a public key S132, and may generate a key matrix, a key value, a first key vector, and a second key vector as a private key S133. In one example, the public key (pk) and the private key (sk) may be generated as shown in Equation 2 below.

$$pk = (A, k), \; sk = (A, k, v1, v2). \quad \text{Equation 2}$$

The second device 200 according to an embodiment of the disclosure may generate a public key and a private key using a key value defined using a lattice-based algorithm, may increase the security of the public key by including a key vector in the private key, and may fully decode data using the private key.

Figure 6:
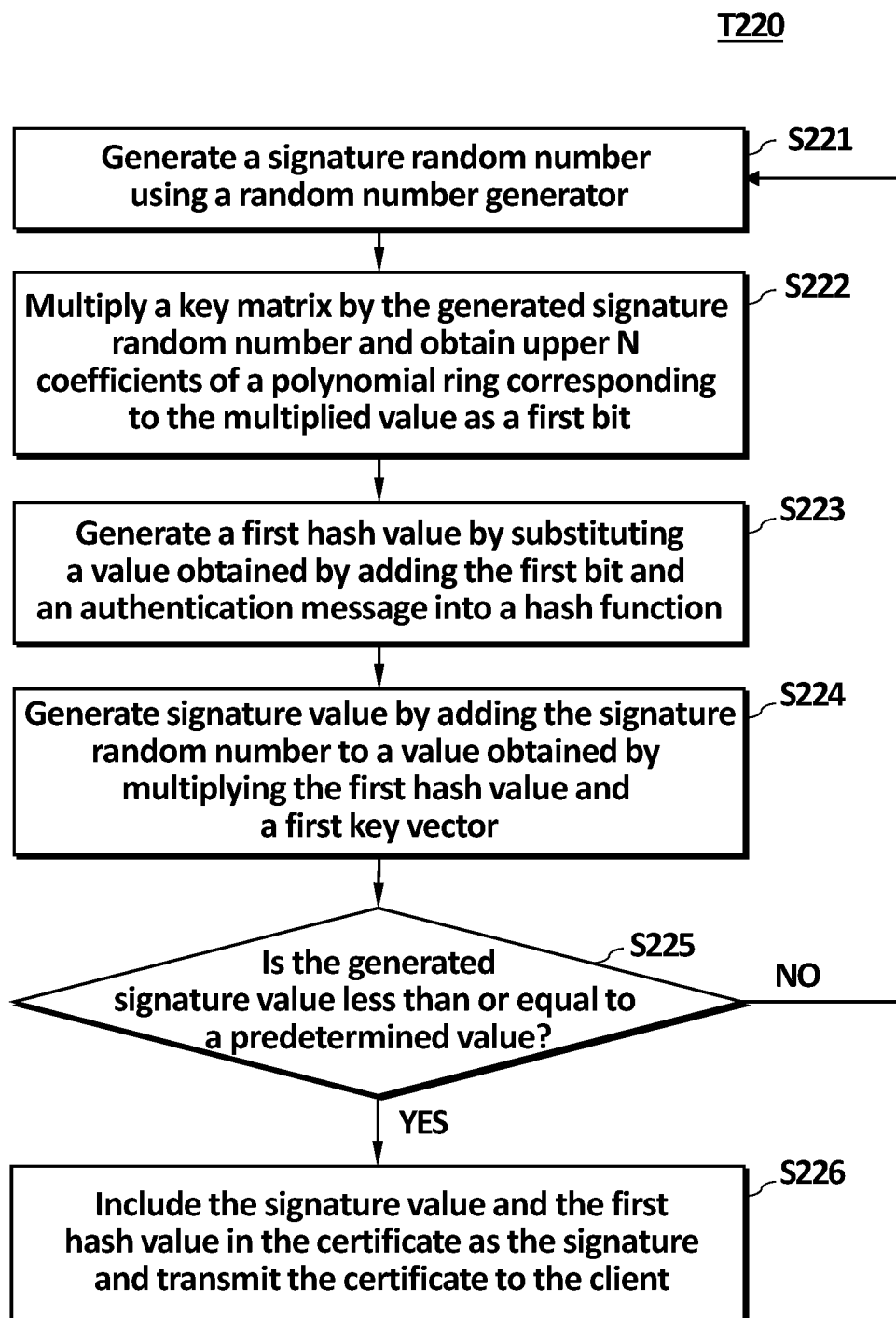
FIG. 6 is a flowchart illustrating a post-quantum signature method according to an example embodiment.

FIG. 6 is a flowchart illustrating a post-quantum signature method according to an example embodiment. In detail, FIG. 6 illustrates the signature step T220 of FIG. 2 in detail.

Referring to FIG. 6, the second device 200 may generate a signature random number using a random number generator S221. The second device 200 may calculate a first matrix by multiplying the key matrix included in the public key by the generated signature random number, and obtain upper N (N is a natural number) coefficients of the polynomial ring corresponding to the calculated first matrix as first bits S222. In one example, the second device 200 may obtain the first bit by listing the top N coefficients of the polynomial ring. According to an exemplary embodiment of the present disclosure, the second device 200 may determine the hash value by using the top N coefficients in the polynomial ring, and thus accurate authentication may be possible in the authentication procedure in spite of the lattice-based algorithm.

The second device 200 may generate a first hash value by substituting a value obtained by adding the first bit and the authentication message into a hash function S223. In an example, the authentication message may indicate a message having a meaning arbitrarily determined by the second device 200, and the action of adding the first bit and the authentication message may mean an action of adding the first bit to a bit value corresponding to the authentication message.

The second device 200 may generate a signature value by adding a signature random number to a value obtained by multiplying the first hash value by the first key vector included in the private key S224. For the first hash value h1, the first key vector v1, and the signature random number rn, the signature value sv may be determined according to the following Equation 3.

$$sv = h1 \cdot v1 + rn \qquad \text{Equation 3}$$

The second device 200 may check whether the generated signature value is equal to or less than a predetermined value S225. When the generated signature value is less than or equal to the predetermined value, the second device 200 may include the signature value and the first hash value in the certificate as the signature and transmit the certificate to the first device 100 S226, and when the generated signature value is not less than or equal to the predetermined value, the second device 200 may generate a new signature random number and perform the operation of generating the signature value again.

According to an exemplary embodiment of the present disclosure, the second device 200 may secure post-quantum for the signature by determining the signature value using a lattice-based key vector, a hash value, and a signature random number, and may secure high security by adopting the signature value only when the signature value is equal to or less than a predetermined value.

Figure 7:
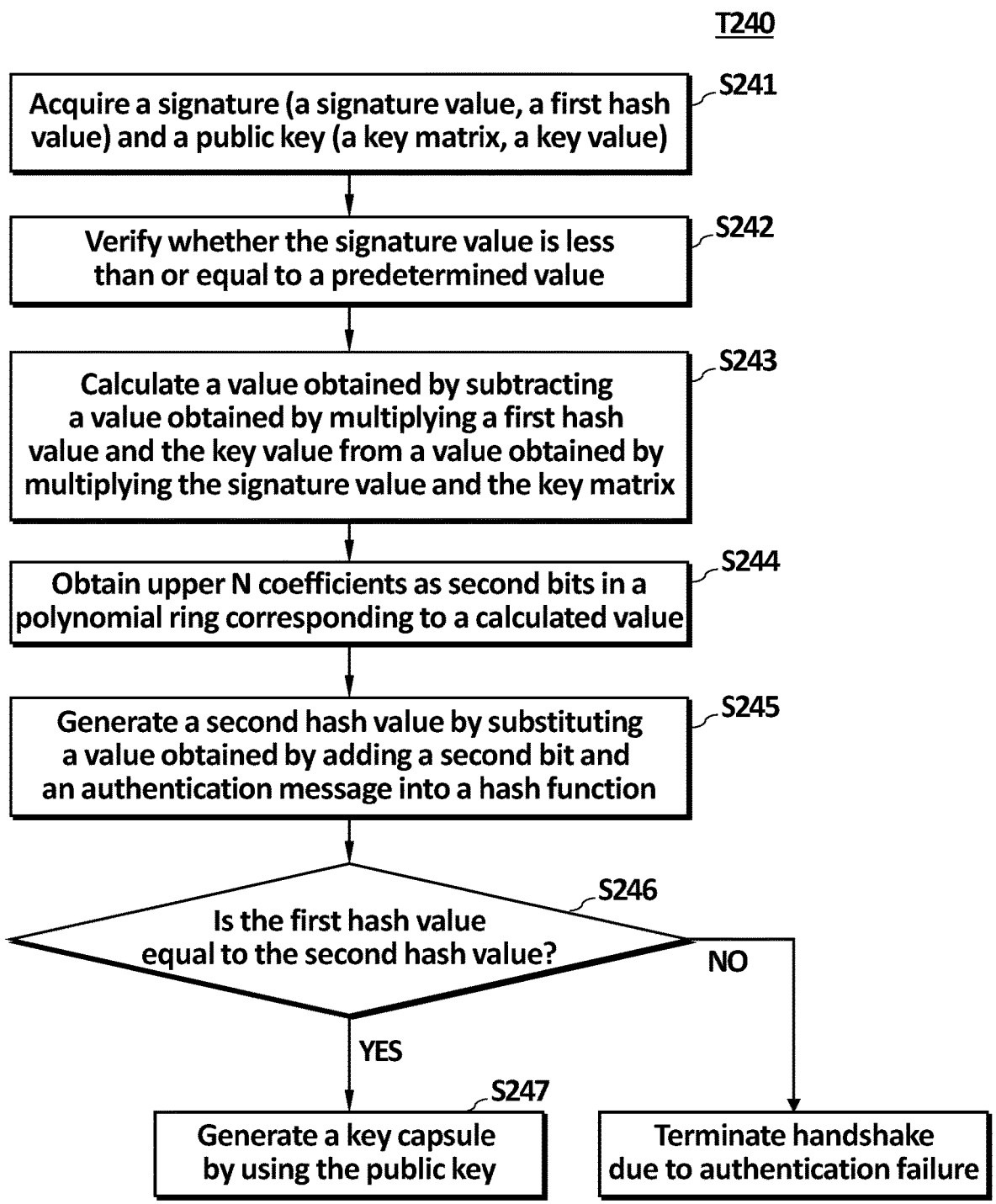
FIG. 7 is a flowchart illustrating a post-quantum authentication method according to an embodiment of the present invention.

FIG. 7 is a flowchart illustrating a post-quantum authentication method according to an embodiment of the present invention. In detail, FIG. 7 illustrates the authentication step T240 of FIG. 2 in detail.

Referring to FIG. 7, the first device 100 may obtain a signature including a signature value and a first hash value, and a public key including a key matrix and a key value from a certificate S241. The first device 100 may check whether the signature value is equal to or less than a predetermined value S242. In an embodiment, the predetermined value may be a value previously discussed with the second device 200, and the first device 100 may primarily determine whether the signature value is altered by determining whether the signature value is less than or equal to a predetermined value.

The first device 100 may calculate a value obtained by subtracting a value obtained by multiplying the signature value by the key matrix and a value obtained by multiplying the first hash value by the key value S243. The client may calculate the following second matrix B with respect to the signature value sv, the key matrix A, the first hash value h1, and the key value k.

$$B = sv \cdot A - h1 \cdot k \qquad \text{Equation 4}$$

By Equation 1 and Equation 3, the second matrix B may be calculated as follows.

$$B = rn \cdot A - h1 \cdot v2 \qquad \text{Equation 5}$$

The first device 100 may obtain upper N coefficients of the polynomial ring corresponding to the second matrix B as second bits S244. The first device 100 may generate a second hash value by substituting a value obtained by adding the second bit and the authentication message into a hash function S245. In one example, the portion of the second matrix B may not be included in the upper coefficient, and accordingly, hash values for upper bits of the first matrix and the second matrix, which are multiples of the key matrix A, may be the same to each other only when the signature is valid according to the property of the hash function.

Therefore, when the first hash value included in the signature is the same to the second hash value obtained by the calculation S246, the first device 100 may generate the key capsule using the public key T250, and when the first hash value included in the signature is not the same to the second hash value obtained by the calculation S246, the first device 100 may terminate the handshake due to the authentication failure S247.

According to an embodiment of the present disclosure, by performing a signature and an authentication procedure by using an upper coefficient of a matrix, an accurate authentication procedure may be performed despite a lattice-based algorithm, and a safe virtual private network may be constructed even in quantum computing.

Although not shown, in an embodiment, the first device 100 may additionally authenticate whether the certificate is valid through an authenticator.

Figure 8:
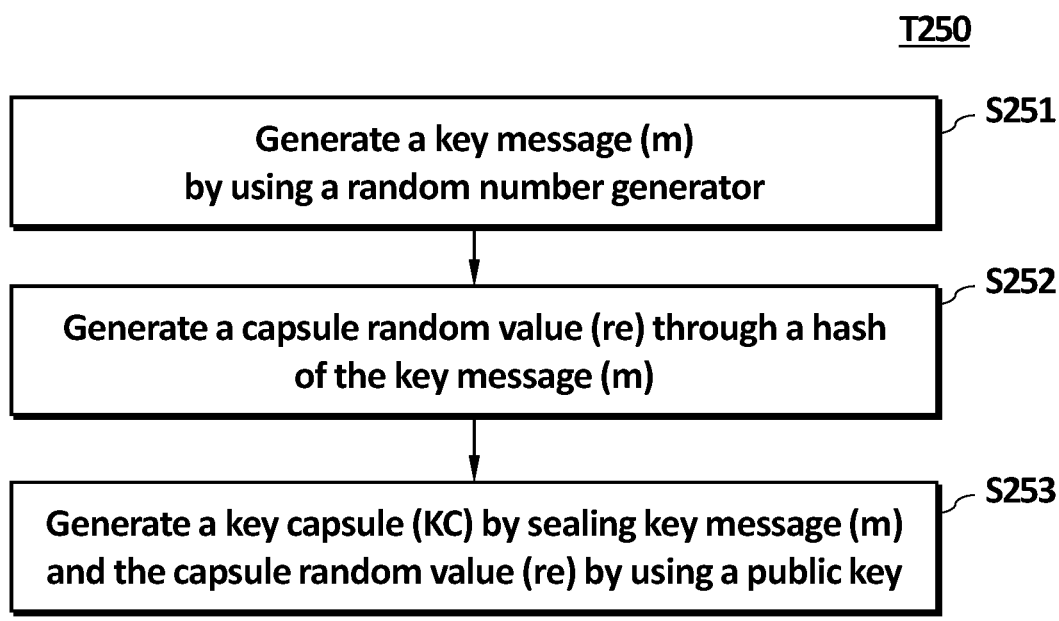
FIG. 8 is a flowchart illustrating a virtual private network key exchange method according to an example embodiment.

FIG. 8 is a flowchart illustrating a virtual private network key exchange method according to an example embodiment. In detail, FIG. 8 illustrates the key capsule generation method T250 of the first device 100 of FIG. 2.

Referring to FIG. 8, the first device 100 may generate a key message m by using a random number generator S251. The random number generator refers to a device for generating a random number or symbol that cannot be theoretically predicted based on entropy, and may include a non-deterministic random bit generator (NRBG) and a deterministic random bit generator (DRBG) according to a noise source to be used. In addition, the key message m is data in which a plurality of bits generated using the random number generator are listed, and may be generated as 256 bit in one example.

The first device 100 may generate a capsule random value re through hash for the key message m S252. The first device 100 may generate a key capsule KC by sealing the key message m and the capsule random value re using the public key S253.

According to an embodiment of the disclosure, the first device 100 may generate a key message m generated as a random value and a capsule random value re which is a hash value for the key message m and seal the key message m and the capsule random value re by using the public key once again, thereby maximizing security of the generated key capsule KC, and an operation of verifying the key capsule KC by the second device 200 by using the key message m and the capsule random value re may be accurately performed.

Figure 9:
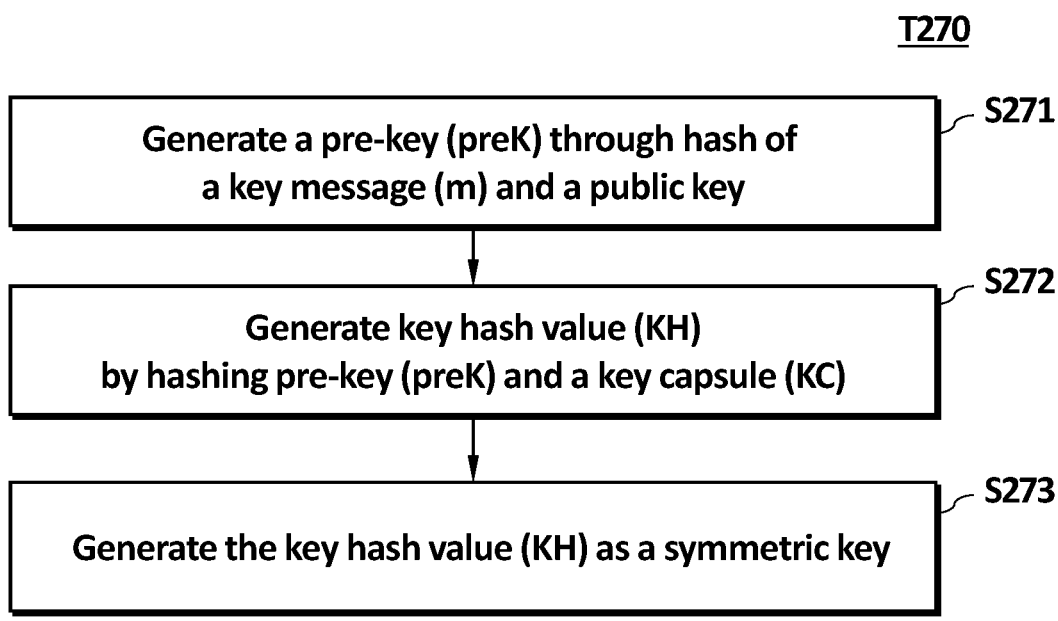
FIG. 9 is a flowchart illustrating a virtual private network key exchange method according to an example embodiment.

FIG. 9 is a flowchart illustrating a virtual private network key exchange method according to an example embodiment. In detail, FIG. 9 illustrates a symmetric key generation method T270 of the first device 100 of FIG. 2.

Referring to FIG. 9, the first device 100 may generate a pre-key preK through a key message m generated using a random number generator and a hash for a public key S271. The first device 100 may generate the key hash value KH by hashing the pre-key preK and the key capsule KC again S272. The first device 100 may use the generated key hash value KH as a symmetric key S273.

According to an exemplary embodiment of the present disclosure, the first device 100 may generate the pre-key preK by using the shared key message m and the public key with the second device 200, and may generate the key hash value KH, which is the symmetric key, by using the shared key capsule KC and the pre-key preK with the second device 200, so that even when the key capsule KC is exposed to an attacker using quantum computing in the process of generating the same symmetric key as the second device 200, the symmetric key may not be exposed to the attacker because the symmetric key is generated by using the pre-key preK, which is not exposed to the attacker, together, and stability of key exchange may be increased.

Figure 10:
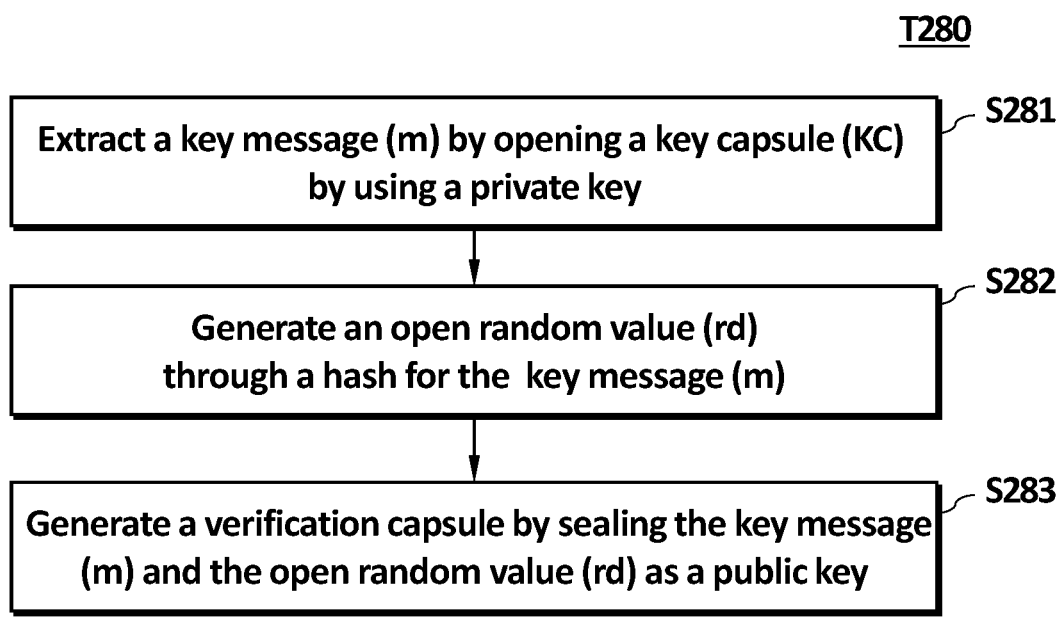
FIG. 10 is a flowchart illustrating a virtual private network key exchange method according to an example embodiment.

FIG. 10 is a flowchart illustrating a virtual private network key exchange method according to an example embodiment. In detail, FIG. 10 illustrates a verification capsule generation method T280 of the second device 200 of FIG. 2.

Referring to FIG. 10, the second device 200 may extract the key message m by opening the key capsule KC using the private key S281. Since the key capsule KC is sealed by the public key, the key message m may be normally extracted by using the private key corresponding to the public key.

The second device 200 may generate the open random value rd through the hash for the key message m S282. In an embodiment, since the output is the same when the inputs are the same in the case of the hash function, when data is not modified by an attacker in the process of transmitting the key capsule KC from the first device 100 to the second device 200, the second device 200 may receive the key message m transmitted from the first device 100 in the same manner, and the open random value rd according to the same may be the same as the capsule random value re.

The second device 200 may generate a verification capsule by sealing the key message m and the open random value rd with the public key S283. In an embodiment, when data transformation is not performed in the process of transmitting the public key from the second device 200 to the first device 100, since the public key utilized by the first device 100 and the public key utilized by the second device 200 are the same, the verification capsule sealed using the public key may be the same as the key capsule KC received from the first device 100.

Figure 11:
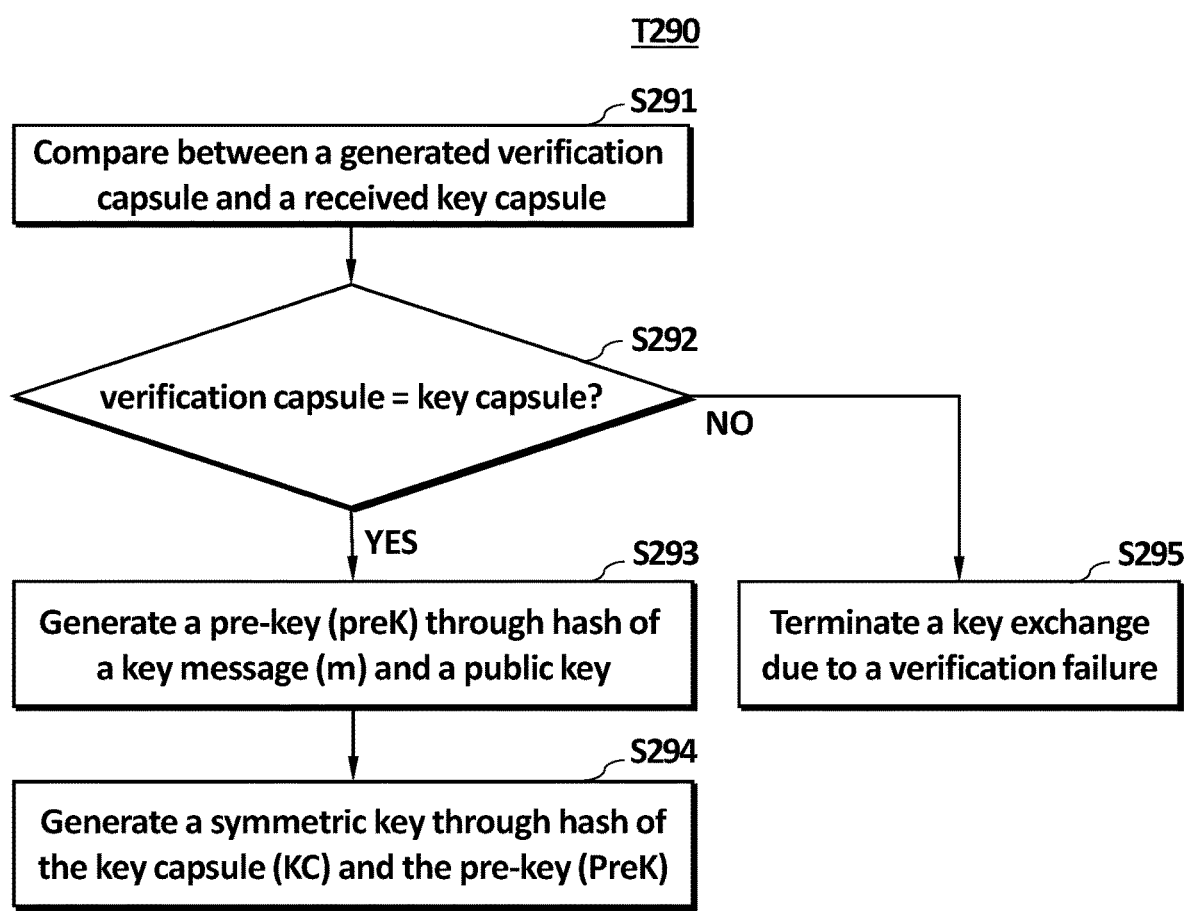
FIG. 11 is a flowchart illustrating a virtual private network key exchange method according to an example embodiment.

FIG. 11 is a flowchart illustrating a virtual private network key exchange method according to an example embodiment. In detail, FIG. 11 illustrates a symmetric key generation method T290 of the second device 200 of FIG. 2.

Referring to FIG. 11, the second device 200 may compare the generated verification capsule with the received key capsule KC S291. As described above, the verification capsule and the key capsule KC may be the same only when the attack of the attacker on the public key and the key capsule is not made, and when the verification capsule and the key capsule KC are the same, it may be guaranteed that the key capsule KC of the first device 100 and the key capsule KC of the second device 200 are the same.

According to an embodiment of the present disclosure, the verification of the key exchange is performed by using the key capsule KC and the verification capsule, so that the data deformation attack from the attacker can be detected in advance, and the security of the virtual private network can be increased.

Therefore, when the verification capsule and the key capsule KC are the same S292, the second device 200 may generate the pre-key preK through the hash for the key message m and the public key S293, may generate the symmetric key through the hash for the key capsule KC and the pre-key preK S294, and when the verification capsule and the key capsule KC are not the same S292, the second device 200 may terminate the key exchange due to the verification failure S295, and may not generate the virtual private network, in the same manner as the symmetric key generation method of the client described above with reference to FIG. 4.

According to an exemplary embodiment of the present disclosure, even when the key capsule KC is exposed to an attacker using quantum computing in the process of generating the same symmetric key as that of the first device 100, the symmetric key may not be exposed to the attacker and the stability of key exchange may be increased because the symmetric key is generated by using the pre-key preK not exposed to the attacker.

Figure 12:
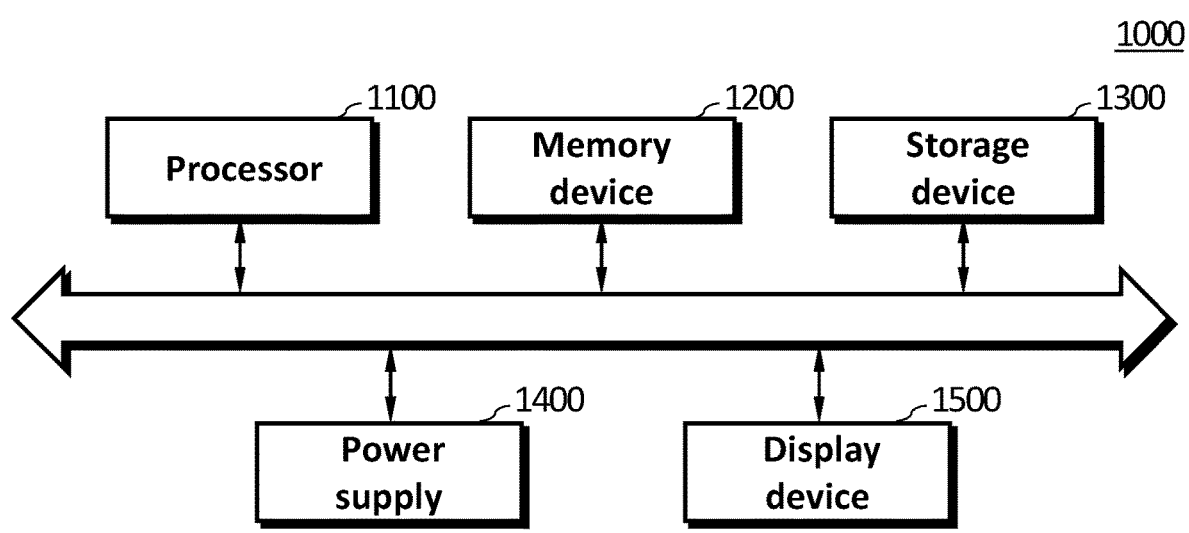
FIG. 12 is a block diagram illustrating a computing system according to an example embodiment.

FIG. 12 is a block diagram illustrating a computing system according to an example embodiment.

Referring to FIG. 12, the computing system 1000 may configure one of the first device 100 and the second device 200, and may include a processor 1100, a memory device 1200, a storage device 1300, a power supply 1400, and a display device 1500. Although not illustrated in FIG. 12, the computing system 1000 may further include ports for communicating with a video card, a sound card, a memory card, a universal serial bus (USB) device, other electronic devices, etc.

As described above, the processor 1100, the memory device 1200, the storage device 1300, the power supply 1400, and the display device 1500 included in the computing system 1000 may configure any one of the first device 100 and the second device 200 according to embodiments of the inventive concept to perform a method of forming a virtual private network. In detail, the processor 1100 may perform the operating method of any one configuration of the virtual private network operating system 10 described above with reference to FIGS. 1 to 11 by controlling the memory device 1200, the storage device 1300, the power supply 1400, and the display device 1500.

The processor 1100 may perform specific calculations or tasks. The processor 1100 may be a micro-processor or a Central Processing Unit (CPU). The processor 1100 may communicate with the memory device 1200, the storage device 1300, and the display device 1500 through a bus 1600 such as an address bus, a control bus, or a data bus. According to an embodiment, the processor 1100 may also be connected to an expansion bus such as a Peripheral Component Interconnect (PCI) bus.

The memory device 1200 may store data necessary for an operation of the computing system 1000. For example, the memory device 1200 may be implemented as a DRAM, a mobile DRAM, an SRAM, a PRAM, an FRAM, an RRAM, and/or an MRAM. The storage device 1300 may include a solid state drive, a hard disk drive, a CD-ROM, etc. The storage device 1300 may store programs, application program data, system data, operating system data, and the like related to the method of forming the virtual private network described above with reference to FIGS. 1 to 11.

The display device 1500 is an output means for notifying a user, and may notify a user or the like of information on a method of forming a virtual private network by displaying the information on the method. The power supply 1400 may supply an operating voltage required for an operation of the computing system 1000.

According to the technical idea of the present invention, high security can be provided by utilizing post-quantum cryptography in a process of performing an initial setting to provide a virtual private network, and accordingly, a safe virtual private network that is not hacked even in the quantum computer can be provided.

Exemplary embodiments have been invented in the drawings and specification as described above. Although embodiments have been described using specific terms in the present specification, they are used only for the purpose of describing the technical idea of the present invention and are not used to limit the meaning or limit the scope of the present invention described in Claims. Therefore, it will be understood by those of ordinary skill in the art that various modifications and other equivalent embodiments are possible therefrom. Therefore, the true technical protection scope of the present invention should be determined by the technical idea of the appended claims.

What is claimed is:

1. A method for forming a virtual private network performed by a first device which includes a processor to form the virtual private network with a second device, the method comprising the steps of:
    requesting, by the processor, a handshake for forming the virtual private network;
    receiving, by the processor, a signature and a public key;
    authenticating, by the processor, the second device by using the signature;
    generating, by the processor, a symmetric key by using the public key; and
    performing, by the processor, virtual private network communication by using the symmetric key,
    wherein generating the symmetric key by using the public key comprises the steps of:
    generating, by the processor, a key message by using a random number generator;
    generating, by the processor, capsule random value by hashing the key message;
    generating, by the processor, a key capsule by capsuling the key message and the capsule random value by using the public key;
    transmitting, by the processor, the key capsule; and
    generating, by the processor, a symmetric key by using the key capsule,
    wherein generating the symmetric key by using the key capsule comprises the steps of:
    generating, by the processor, a prekey through a hash for the key message and the public key;
    generating, by the processor, key hash value by hashing the prekey and the key capsule; and
    generating, by the processor, the key hash value as the symmetric key,
    wherein the public key includes a key value which is determined by values of a second key vector, which is generated by a lattice-based algorithm, added to values obtained by multiplying a first key vector, which is generated by the lattice-based algorithm, and a key matrix.

2. The method for forming a virtual private network of claim 1, wherein the signature comprises a signature value and a first hash value, and the authenticating of the second device using the signature comprises the steps of:
    calculating, by the processor, a first matrix based on the signature value and the public key;
    obtaining, by the processor, upper N (N is a natural number) coefficients of a polynomial ring corresponding to the first matrix as first bits; and
    authenticating, by the processor, the second device based on the first bits.

3. The method for forming a virtual private network of claim 2, wherein the authenticating of the second device based on the first bits comprises the steps of:
    receiving, by the processor, an authentication message from the second device;
    obtaining, by the processor, the first bits and a second hash value for the authentication message;
    determining, by the processor, whether the second hash value is the same to the first hash value; and
    determining, by the processor, that the authentication of the second device is successful when the second hash value is the same to the first hash value.

4. A method for forming a virtual private network performed by a second device which includes a processor to form the virtual private network with a first device, the method comprising the steps of:
    generating, by the processor, a public key and a private key;
    requesting, by the processor, a handshake from the first device;
    performing, by the processor, a signature by using an authenticate message;
    transmitting, by the processor, the signature and the public key to the first device; and
    generating, by the processor, a symmetric key by using a key capsule received from the first device,
    wherein the generating the public key and private key comprises the steps of:
    defining, by the processor, a key matrix corresponding to a random polynomial ring;
    sampling, by the processor, a first key vector generated by a grid-based algorithm and a second key vector having a first distance with the first key vector; and
    generating, by the processor, the public key and the private key by using a key value which is determined by values in a second key vector, which is generated by a lattice-based algorithm, added to values obtained by multiplying a first key vector, which is generated by the lattice-based algorithm, and the key matrix,
    wherein the generating a symmetric key by using the key capsule received from the first device comprises the steps of:
    extracting, by the processor, a key message by opening the key capsule by using the private key;
    generating, by the processor, opened random value through hash for the key message;
    generating, by the processor, verification capsule by capsuling the key message and the opened random value as the public key;
    confirming, by the processor, if the verification capsule and the key capsule are the same;
    generating, by the processor, a prekey by hashing the key message and the public key if the verification capsule and the key capsule are the same; and
    generating, by the processor, a symmetric key by hashing the key capsule and the prekey.

5. The method for forming a virtual private network of claim 4, wherein the defining of the key matrix comprises the steps of:
    generating, by the processor, a random number using a random number generator;
    generating, by the processor, a seed by substituting the random number into a hash function;
    generating, by the processor, the random polynomial ring using the seed; and
    defining, by the processor, the key matrix corresponding to the random polynomial ring.

6. The method for forming a virtual private network of claim 4, wherein the performing of the signature comprises the steps of:
    obtaining, by the processor, a second bit based on the key matrix;

obtaining, by the processor, the second bit and a second hash value for the authenticate message; and generating, by the processor, a signature value using the second hash value and a first key vector.

7. The method for forming a virtual private network of claim 6, wherein the obtaining of the second bit comprises the steps of:

obtaining, by the processor, a signature random number using a random number generator;

calculating, by the processor, a second matrix by multiplying the key matrix by the signature random number; and acquiring, by the processor, upper N (N is a natural number) coefficients in a polynomial ring corresponding to the second matrix as the second bit.

* * * * *